(12) United States Patent
Sugaya et al.

(10) Patent No.: US 6,980,819 B2
(45) Date of Patent: Dec. 27, 2005

(54) RADIO COMMUNICATION SYSTEM, AND APPARATUS, METHOD, AND COMPUTER PROGRAM FOR SAID RADIO COMMUNICATION SYSTEM

(75) Inventors: Shigeru Sugaya, Kanagawa (JP); Masakatsu Toyoshima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/185,562

(22) Filed: Jul. 20, 2005

(65) Prior Publication Data

US 2005/0255844 A1    Nov. 17, 2005

Related U.S. Application Data

(63) Continuation of application No. 10/375,367, filed on Feb. 27, 2003.

(51) Int. Cl.[7] .............................................. H04B 15/00
(52) U.S. Cl. ...................... 455/501; 455/500; 455/507; 455/509; 455/422.1; 455/450; 370/336; 370/337; 370/347; 370/345; 379/338; 379/345
(58) Field of Search ................................ 455/501, 500, 455/507, 509, 422.1, 450; 370/336, 337, 370/347; 379/338, 345

(56) References Cited

U.S. PATENT DOCUMENTS

| | | | | |
|---|---|---|---|---|
| 5,548,800 | A * | 8/1996 | Olds et al. .................. | 455/12.1 |
| 6,198,919 | B1 * | 3/2001 | Buytaert et al. .......... | 455/426.1 |
| 6,477,385 | B1 * | 11/2002 | Hara ........................... | 455/502 |
| 6,490,446 | B1 * | 12/2002 | Haartsen .................... | 455/422.1 |
| 6,745,036 | B1 * | 6/2004 | Dunne et al. ............. | 455/456.1 |
| 2002/0061031 | A1 * | 5/2002 | Sugar et al. ................ | 370/466 |
| 2002/0071413 | A1 * | 6/2002 | Choi ........................... | 370/337 |
| 2003/0198253 | A1 * | 10/2003 | Ahmed ....................... | 370/470 |
| 2004/0162080 | A1 * | 8/2004 | Kostic et al. ............... | 455/450 |

* cited by examiner

*Primary Examiner*—Lester G. Kincaid
*Assistant Examiner*—Khai Nguyen
(74) *Attorney, Agent, or Firm*—Jay H. Maioli

(57) ABSTRACT

A communication system that permits the coexistence of a plurality of ultrawide band (UWB) radio communication networks that use different signal systems is achieved by using the same beacon signal and specifying the format of part of the control command among a plurality of UWB radio communication networks that use different signal systems, as defined, for example, by impulse period, impulse width, spreading ratio, and spreading code. When one UWB network receives a beacon signal from another UWB network, judging from the received beacon signal it grasps the transmission parameter that is used by another party and performs time-division on the transmission frame period for its own system.

3 Claims, 9 Drawing Sheets

F I G. 1
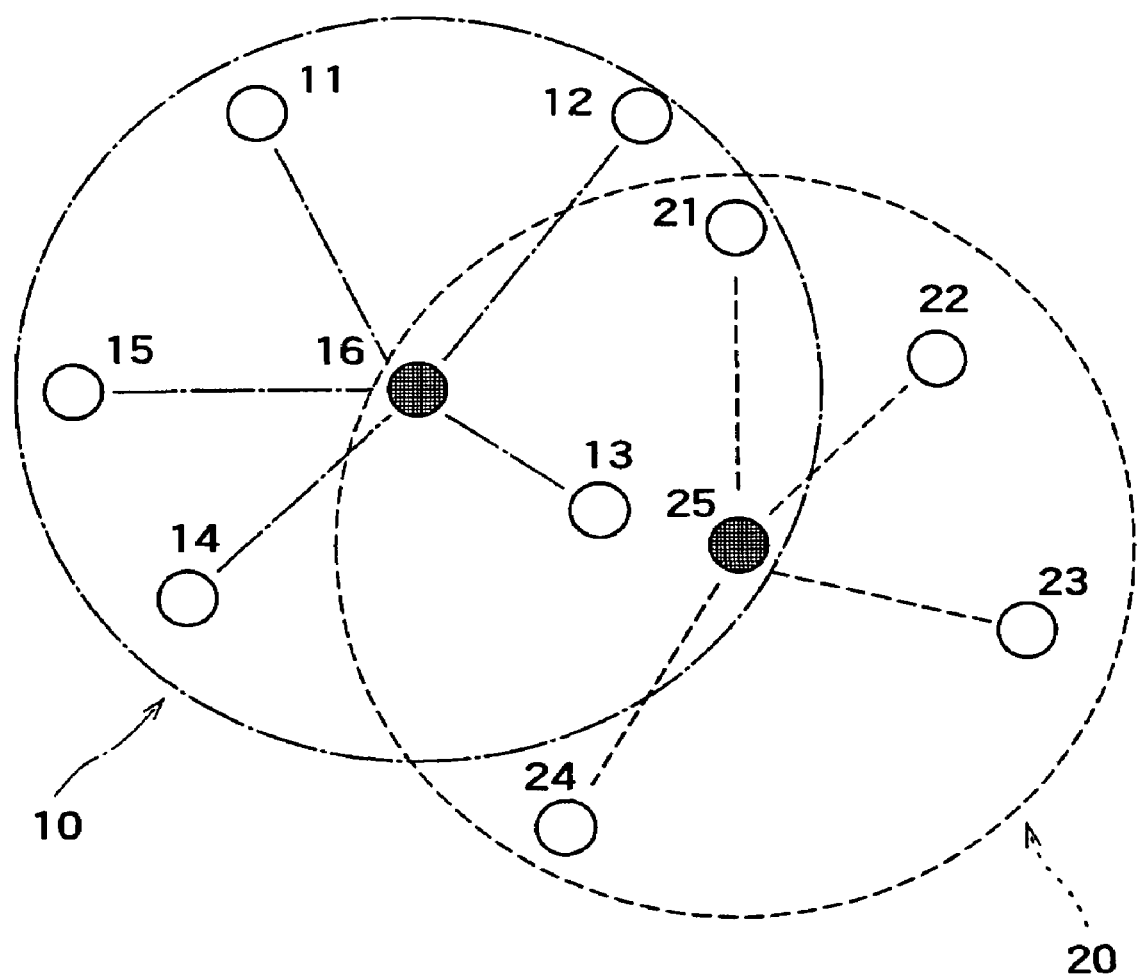

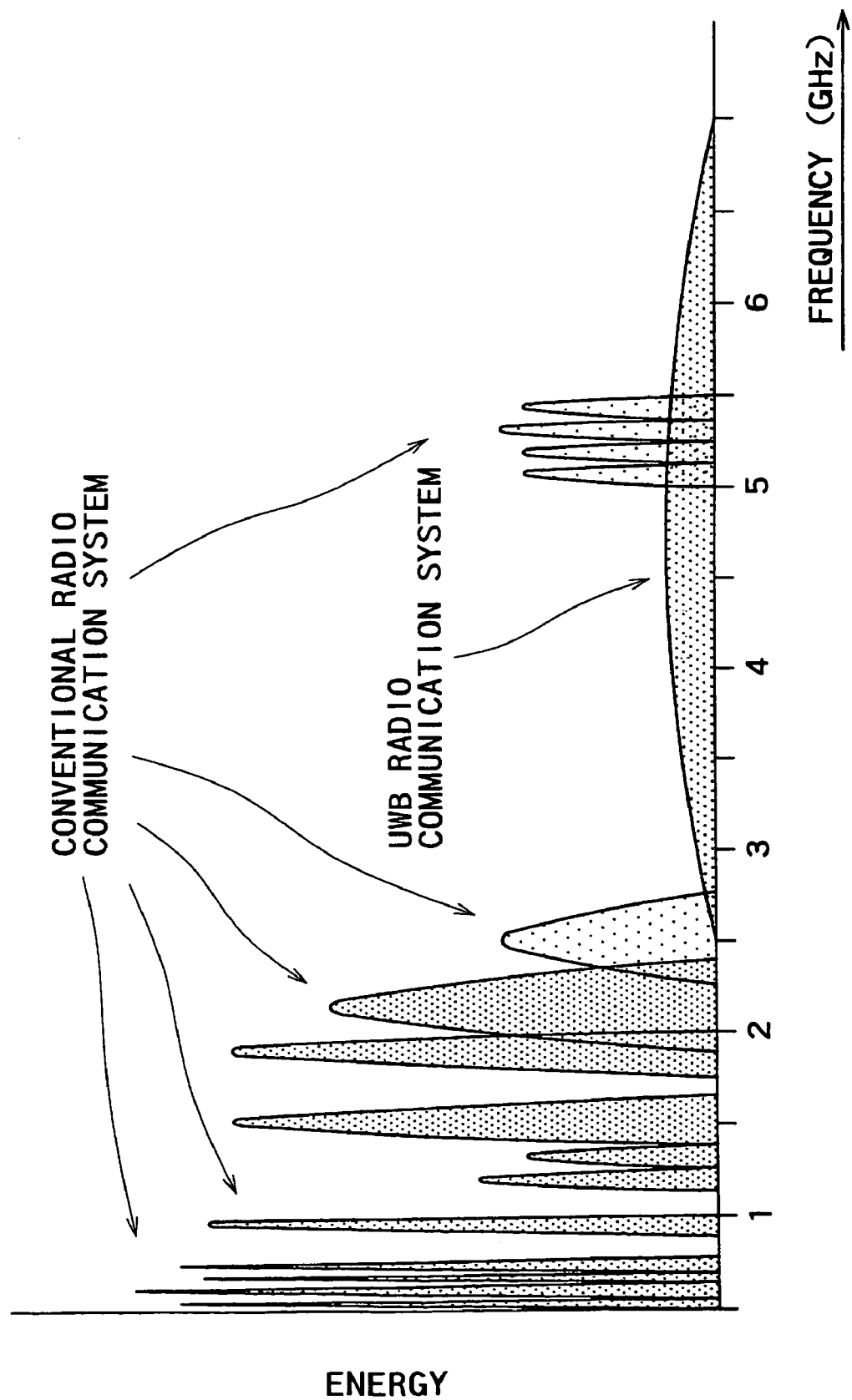

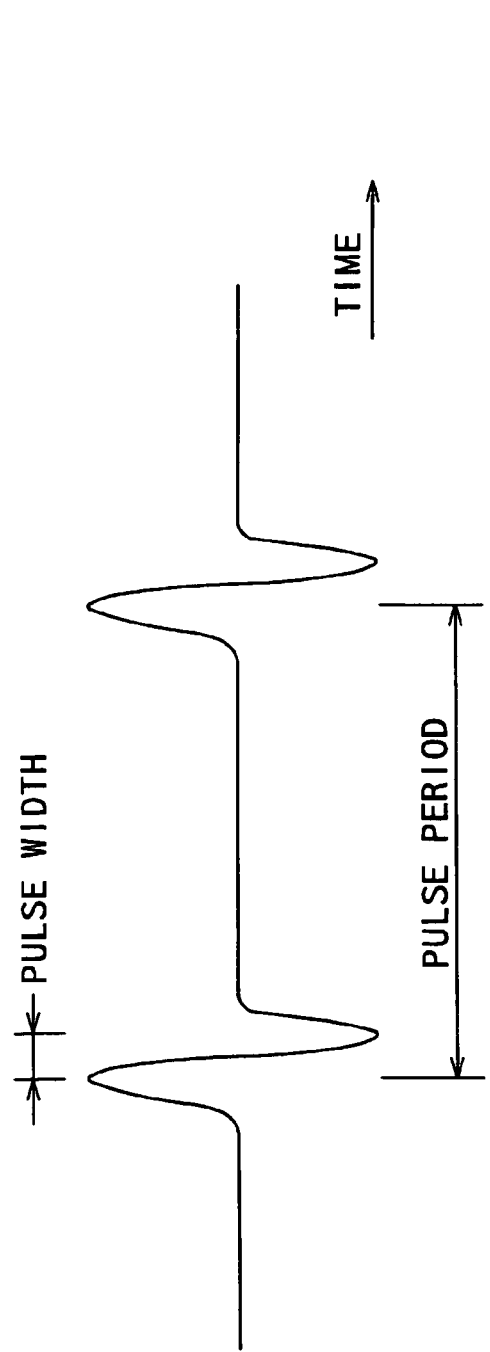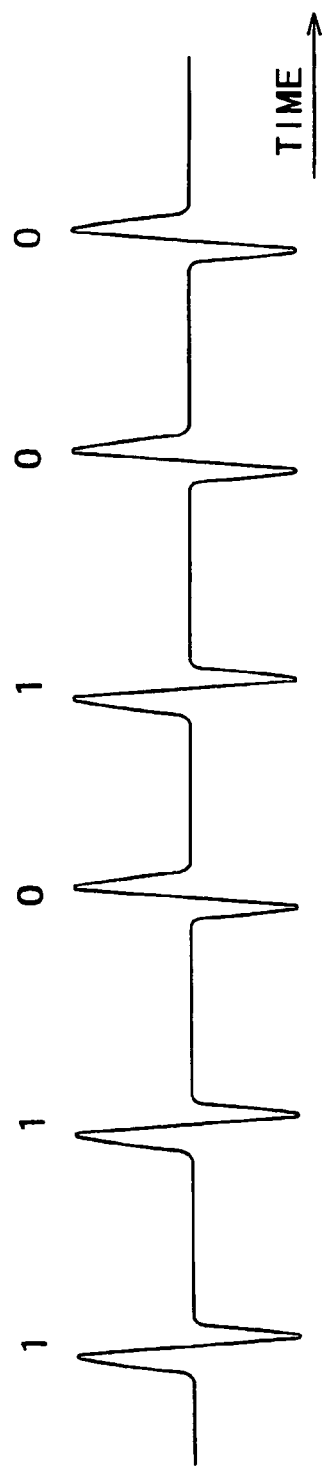

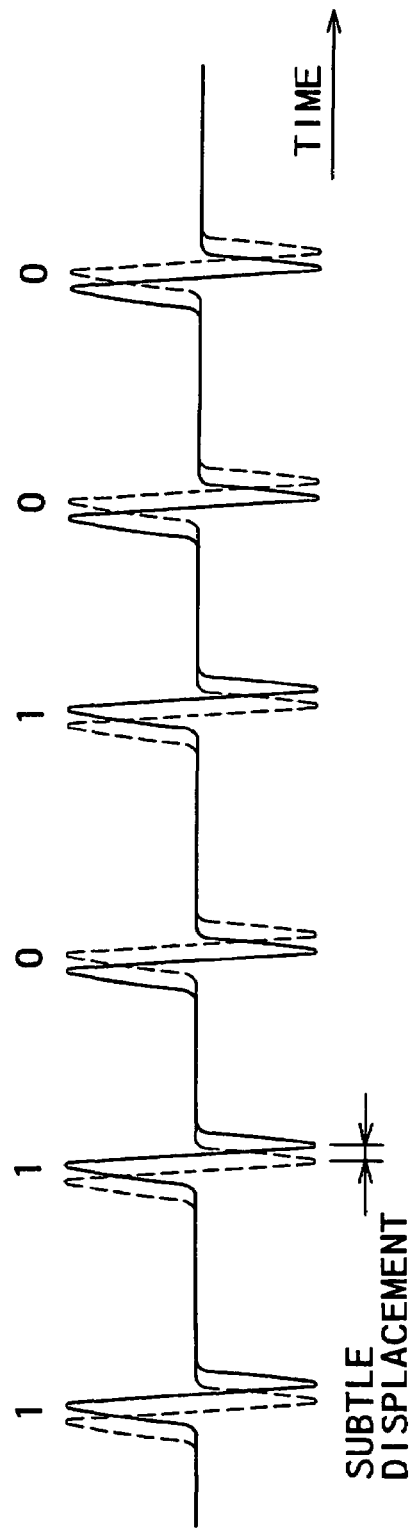
F I G. 5
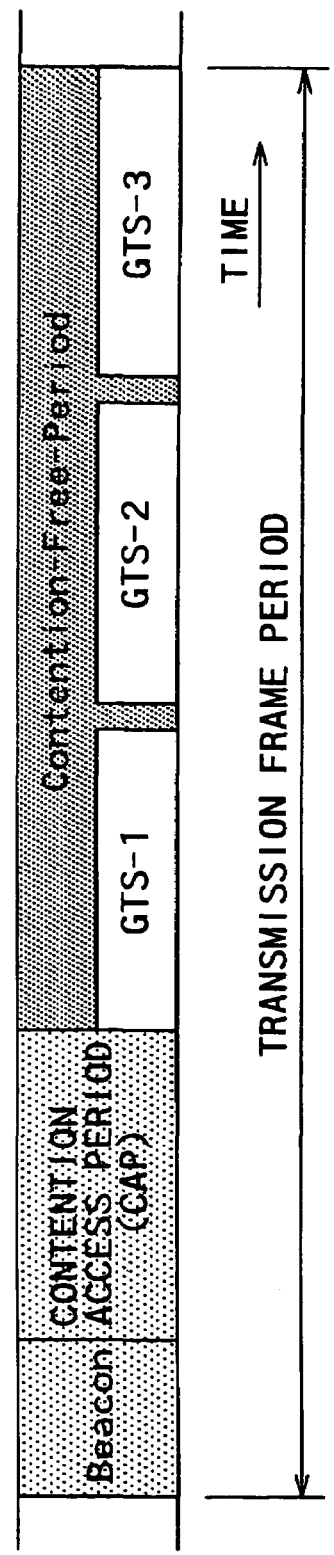
F I G. 6

FIG. 8

| Beacon IDENTIFIER | Device IDENTIFIER | Network SYNCHRONIZING PARAMETER | SLOT ALLOCATION INFORMATION | USED UWB SIGNAL INFORMATION | ANOTHER SYSTEM DETECTION INFORMATION | ANOTHER SYSTEM USE INFORMATION |

FIG. 9

| COMMON CONTROL SIGNAL IDENTIFIER | SENDER Device INFORMATION | RECIPIENT Device INFORMATION | CONTROL SIGNAL INFORMATION LENGTH | COMMAND INFORMATION | TIME-DIVISION USE REQUEST INFORMATION |

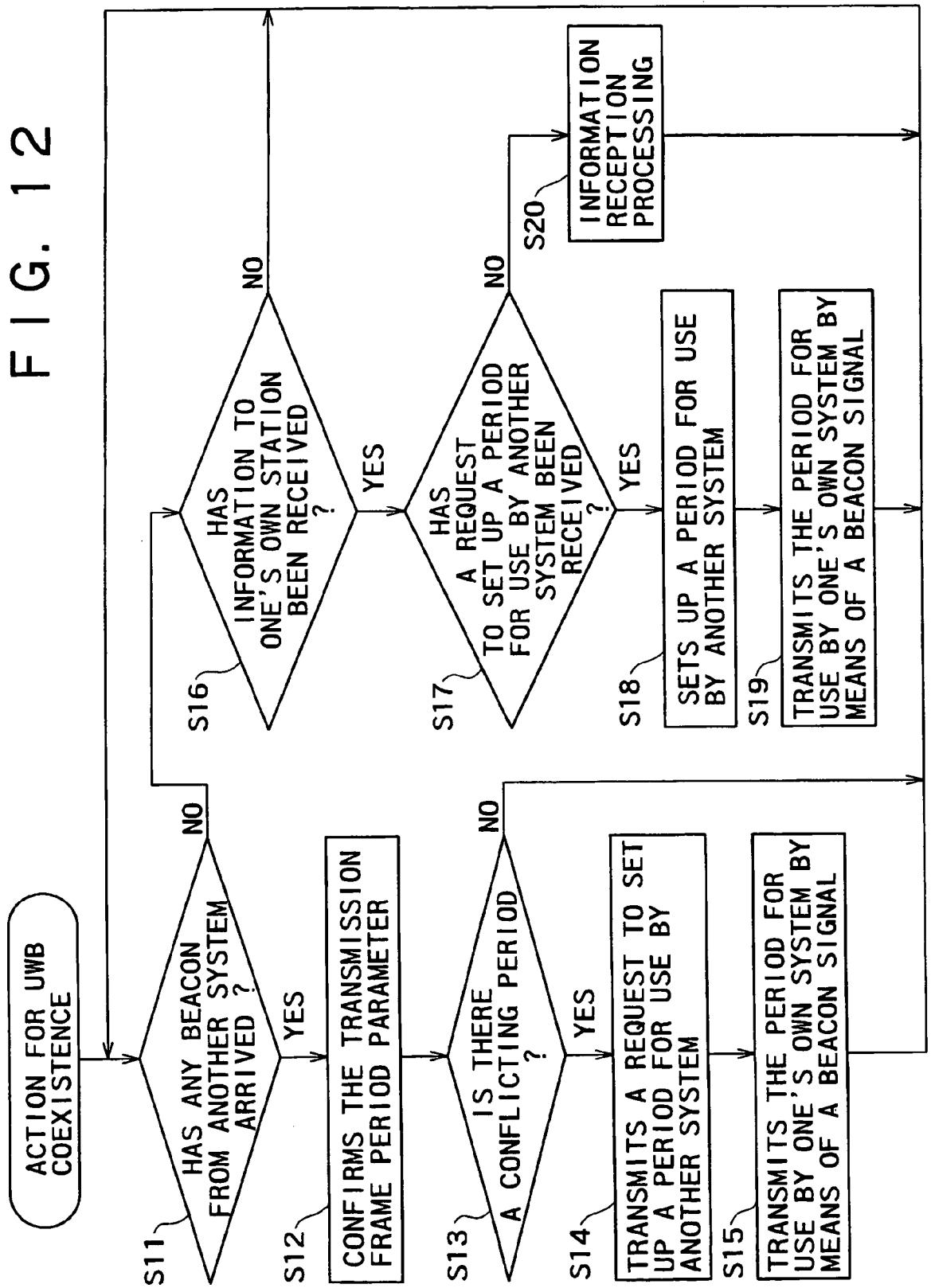

RADIO COMMUNICATION SYSTEM, AND APPARATUS, METHOD, AND COMPUTER PROGRAM FOR SAID RADIO COMMUNICATION SYSTEM

This is a continuation of prior application Ser. No. 10/375,367 filed Feb. 27, 2003.

BACKGROUND OF THE INVENTION

1. Field of the Invention

The present invention relates to a radio communication system for communications between a plurality of radio stations, and also to an apparatus, method, and computer program for said radio communication system. More particularly, the present invention relates to a radio communication system having a network constructed under control of a specific control station and also to an apparatus, method, and computer program for radio communication for transmission of information within such a wireless network.

To be more specific, the present invention relates to a radio communication system in which there exist a plurality of networks which compete with one another and also to an apparatus, method, and computer program for such a radio communication system. More particularly, the present invention relates to a radio communication system to solve competition among a plurality of wireless networks which use different signal systems and also to an apparatus, method, and computer program for such a radio communication system.

2. Description of the Related Art

By constructing a local area network (LAN) from a plurality of computers connected to one another, it is possible to share information (such as file and data) and peripherals (such as printer) and to transmit and exchange information (such as e-mail and data contents).

It has been common practice to construct a LAN by wiring with optical fibers, coaxial cables, or twisted pair cables. This conventional LAN has the disadvantage of requiring troublesome wiring works, which prevents easy construction of a network. In addition, a wired LAN inconveniently limits the movement of apparatuses within the cable length. The wireless LAN, which has appeared as a new system to remove inconvenience from the conventional wired LAN, is now attracting attention. The wireless LAN of this kind eliminates most cables in an office and permits communication terminals, such as personal computers (PC), to be moved comparatively easily.

There is a rapidly increasing demand for the wireless LAN system as it achieves a greater speed and decreases in price. Nowadays, many users are considering the introduction of a personal area network (PAN), which is a small-scale wireless network for information exchange between a plurality of electronic apparatuses present around individual users. There are different radio communication systems based on specific frequency bands (such as 2.4 GHz and 5 GHz band) which do not need any license from supervisory offices.

The high-speed personal area network is being standardized in IEEE 802.15.3, which is based on the PHY (physical) layer utilizing signals in the 2.4 GHZ band.

According to this IEEE 802.15.3, the MAC (medium access control) sublayer specified therein can be used as another PHY layer other than the PHY layer that uses signals in the 2.4 GHz band. The MAC sublayer has a contention access period (CAP) and a contention-free period (CFP). Asynchronous communications are performed by using the contention access period in which short data and command information are exchanged. On the other hand, stream communications are performed within the contention-free period in which slots called guaranteed time slot (GTS) are allocated for bandwidth reserve transmission.

Recently, standardization is going on to use the PHY layer specified in IEEE 802.15.3 for other PHY layers than those which use signals in the 2.4 GHz band.

Among systems for the high-speed wireless personal area network is UWB (ultra-wide-band). This radio communication system is designed to realize high-speed data transmission in which data is spread over an extremely wide frequency band, say, 2 to 6 GHz.

The UWB radio communication system sends a signal by repeating an impulse string, which has a prescribed pulse width, within a prescribed pulse period. The signal transmitted in this way is a signal string constructed of information bits. There are several possible ways of representing the signal string. In other words, one signal string may have a varied frequency band and a spread signal band width.

This signal string may be modulated in various ways. For example, it is possible to express the bit values of 0 and 1 by changing the phase of the pulse, and it is also possible to express multiple values by subtly changing the position of the pulse.

In the recent communication environment in which information equipment has come into general use, a variety of apparatuses are present in an office, and apparatuses are connected to one another through a wireless network, there occurs an undesirable instance in which wireless networks become congested in a limited area and a plurality of wireless networks use the same frequency band.

In such a case there is no means to exclude signals coming from another wireless networks. It is only permissible for one wireless network to begin transmission after confirming a period of time in which another wireless network remains idle. For example, the control station of a network decodes the beacon information coming from another network to obtain the band allocation information, then, based on such information, it excludes the band allocation region being used by another network and re-establishes the band allocation region to be used by its own network.

In the case of the above-mentioned UWB wireless communication network, data to be transmitted is spread over an extremely wide band width. This leads to a great possibility that one wireless communication network competes with its adjacent ones.

Because of its inherent properties, the UWB radio communication system employs signals which have been spread over the entire wide frequency band. This poses difficulties in operating the system by switching the frequency as in the conventional radio system.

In addition, the UWB radio communication system may use various signal strings and modulation schemes (which are collectively referred to as "signal system" hereinafter) depending on the signal aspect, impulse period, impulse width, spread ratio, and spreading code. The problem with the UWB radio communication networks which employ different signal systems is that signals from one network to another cause interference and the beacon signal from another network cannot be decoded because of non-interchangeability of signal expressions. The consequence is that it is impossible to mutually confirm the presence of networks or it is impossible to detect the region which is being used for communication by another network.

OBJECT AND SUMMARY OF THE INVENTION

The present invention was completed to tackle the above-mentioned technical problem. It is an object of the present invention to provide an improved radio communication system which permits the coexistence of a plurality of competing wireless networks which use the same frequency band, and also to provide an apparatus, method, and computer program for said radio communicate system.

It is another object of the present invention to provide an improved radio communication system which permits the coexistence of a plurality of wireless networks that use different signal systems without contention, and also to provide an apparatus, method, and computer program for said radio communication system.

The first aspect of the present invention resides in a radio communication system consisting of a plurality of wireless networks which use different signal systems, said radio communication system being characterized in that control information is exchanged between the control station in one wireless network and the control station of another wireless network by means of the same signal system, thereby solving contention between them, and subsequently the transmission of information is accomplished in one wireless network without interference with another wireless network.

The term "radio communication system" as used herein is a logical assembly of a plurality of apparatuses (or functional modules to perform a specific function), no matter whether or not such apparatuses and functional modules are enclosed in a single package.

The wireless network herein is one which is designed to perform UWB radio communication for high-speed data transmission by spreading over an extremely high frequency band. The signal used in the UWB radio communication system denotes a signal string constituting certain information bits because it is transmitted by repeating impulse strings having a prescribed pulse width in a prescribed pulse frequency. In the UWB radio communication system, the signal system may vary depending on the signal aspect, impulse period, impulse width, spread ratio, and spreading code.

A UWB wireless network is greatly liable to compete with its adjacent wireless network because it performs transmission by spreading data over an extremely wide band. The only possible way for one wireless network to avoid competition with another wireless network is to confirm the time in which another wireless network remains idle and then transmit signals, because it has no means to eliminate signals coming from another wireless network. However, confirming the available time is impossible among UWB wireless networks using different signal systems, because one wireless network cannot decode the beacon information from another wireless network. For this reason, such wireless networks cannot coexist.

By contrast, the present invention offers the advantage of permitting one network to know if there exists a different UWB radio communication system nearby and to know how such a network is operating. This advantage is due to the fact that the same format is applied to the beacon signal scheme (pulse period, pulse width, modulation scheme, and spreading code) used by different UWB radio communication systems.

Each wireless network operates with its inherent transmission frame period. The control station of one wireless network transmits the beacon signal and other control information that describes how the network is utilized to the control station of another wireless network by using the common signal system. Thus they can exchange control information between them, thereby solving the problem with competition between networks.

The second aspect of the present invention resides in an apparatus for radio communication which operates in a wireless network environment in which there coexist a plurality of wireless networks which use different signal systems, said apparatus for radio communication comprising a common signal reception means to receive control information transmitted from another network by means of a signal system common with that of another network, a competition solving means to solve competition with one network on the basis of the control information from another network which has been received by said common signal reception means, a control information generating means to generate the control information of one network in accordance with the result of competition solution achieved by said competition solving means, and a common signal transmission means to transmit the control information in one network by means of a signal system common with that of another network.

The apparatus for radio communication according to the second aspect of the present invention offers the advantage that one radio communication system can let another radio communication system know its presence because it has the common signal transmission means to transmit signals which are common with another radio communication system. Moreover, one radio communication system can recognize the presence of another radio communication system because it has the common signal reception means to receive signals which are common with another radio communication system.

Said competition solving means may be constructed such that one network confirms the period being used by another network from which the control information has been received and then it sets up the period it uses. Alternatively, one network asks another network to set up the use period so as to avoid conflicts with the period it uses.

The third aspect of the present invention resides in an apparatus for radio communication which operates in a wireless network environment in which there coexist a plurality of wireless networks which use different signal systems, said apparatus for radio communication comprising a common signal reception means to receive control information transmitted from another network by means of a signal system common with that of another network, a radio transmission/reception means to exchange information with another radio communication apparatus within one network by means of the signal system which is used within one network, and a radio transmission/reception control means to control the action for information transmission within one network on the basis of another network's control information which has been received by said common signal reception means.

As mentioned above, the wireless network involved in the present invention transmits beacon signals and other control information describing how the network is being used, by means of a common signal system which is different from that used for ordinary information transmission. Therefore, the apparatus for radio communication needs at least the common signal reception means to receive and decode the control information in order to transmit information through the wireless network under control by the control station. Needless to say, the common signal reception means may be omitted if the same signal system is used for ordinary information transmission and control information transmission.

The fourth aspect of the present invention resides in a computer program written in a computer-readable format to be executed on a computer system which does processing for operation in a wireless network environment in which there coexist a plurality of wireless networks which use different signal systems, said computer program comprising a common signal reception step to receive control information transmitted from another network by means of a signal system common with that of another network, a competition solving step to solve competition with one network on the basis of the control information from another network which has been received in said common signal reception step, a control information generating step to generate the control information of one network in accordance with the result of competition solution achieved in said competition solving step, and a common signal transmission step to transmit the control information in one network by means of a signal system common with that of another network.

The fifth aspect of the present invention resides in a computer program written in a computer-readable format to be executed on a computer system which does processing for operation in a wireless network environment in which there coexist a plurality of wireless networks which use different signal systems, said computer program comprising a common signal reception step to receive control information transmitted from another network by means of a signal system common with that of another network, and a radio transmission/reception step to execute the information transmission action within one network on the basis of the control information from another network which has been received in said common signal reception step.

The fourth and fifth aspects of the present invention each define a computer program (in the computer-readable format) to do processing on a computer system. In other words, with this computer program installed, the computer system produces the same effect as the radio communication apparatus pertaining to the third and fourth aspects of the present invention.

Other features and advantages of the present invention will be apparent from the following description of embodiments taken in connection with the accompanying drawings.

BRIEF DESCRIPTION OF THE DRAWINGS

FIG. 1 is a schematic diagram showing the radio communication environment pertaining to the first embodiment of the present invention;

FIG. 2 is a diagram showing frequency bands used for various radio communication systems;

FIG. 3 is a schematic diagram showing an example of the construction of signals used in the UWB radio communication system;

FIG. 4 is a schematic diagram showing an example of the construction of signals used in the first UWB wireless network 10;

FIG. 5 is a schematic diagram showing an example of the construction of signals used in the second UWB wireless network 20;

FIG. 6 is a schematic diagram showing an example of the construction of the transmission frame period used in the radio communication system pertaining to the present invention;

FIG. 8 is a diagram showing an example of the construction of the beacon signal used in the embodiment of the present invention;

FIG. 9 is a diagram showing an example of the construction of the common control signal;

FIG. 12 is a modified flow chart showing the procedure for communication processing by which the radio communication apparatus 100 pertaining to the embodiment works as the control station.

DESCRIPTION OF THE PREFERRED EMBODIMENTS

Figure 7:
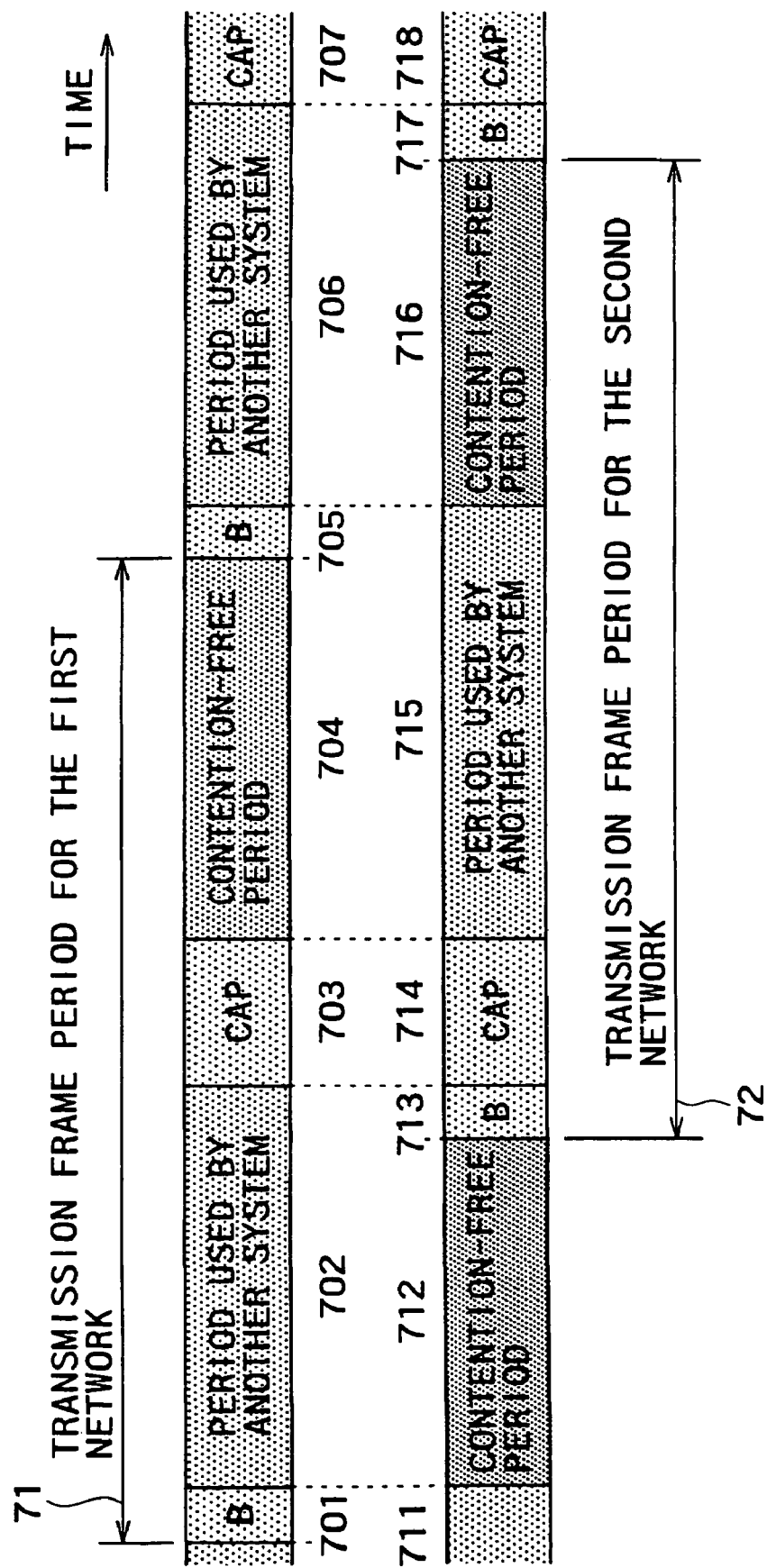
FIG. 7 is a diagram showing how time-division multiplexing is accomplished for the first UWB wireless network 10 and the second UWB wireless network 20.

The embodiments of the present invention will be described in more detail with reference to the accompanying drawings.

FIG. 1 is a schematic diagram showing the radio communication environment pertaining to the first embodiment of the present invention.

FIG. 1 illustrates by example a first UWB wireless network 10 and a second UWB wireless network 20, the former consisting of communication apparatuses 11, 12, 13, 14, and 15, and a control station 16, and the latter consisting of communication apparatuses 21, 22, 23, and 24, and a control station 25.

This figure suggests that those communication apparatuses 13 and 21, which belong to both of the networks 10 and 20, are ready to receive more than one beacon signal.

This figure also suggests that the control stations 16 and 25, which belong to the respective networks, are ready to receive the beacon signal from each other.

In each of the first and second UWB wireless networks 10 and 20, high-speed data transmission is accomplished by spreading data over an extremely high-frequency band, for example, from 2 GHz to 6 GHz. However, communication between the two wireless networks 10 and 20 is accomplished by means of non-interchangeable signal systems differing in signal aspect, impulse period, impulse width, spread ratio, and spreading code. Consequently, in the communication area in which both networks 10 and 20 coexist, their signals cause interference.

FIG. 2 is a diagram showing frequency bands used for various radio communications systems. It is apparent from this figure that the ultra-wide-band overlaps with various existing frequency bands used by the existing radio systems.

FIG. 3 is a schematic diagram showing an example of the construction of signals used in the UWB radio communication system. It is noted that the UWB signal is constructed of a string of impulses which have a prescribed impulse width and are repeated in a prescribed period.

FIG. 4 is a schematic diagram showing an example of the construction of signals used in the first UWB wireless network 10. The signal system shown in this figure is so designed as to represent the bit values of 0 and 1 as the pulse phase changes. In other words, the phase for an impulse to rise and fall represents the bit value of 1, and the phase for an impulse to fall and rise represents the bit value of 0. This signal system is called "Biphase Modulation". The sequence of impulse rise and fall may be reversed to represent 1's and 0's.

FIG. 5 is a schematic diagram showing an example of the construction of signals used in the second UWB wireless network 20. The signal system shown in this figure is so designed as to represent the bit values of 0 and 1 in terms of the subtle change in pulse timing. In other words, a delay of impulse timing represents the bit value of 0, and an advance of impulse timing represents the bit value of 1. This signal system is called "Pulse Position Modulation" (PPM). The sequence of impulse timing (delay and advance) may be reversed to represent 1's and 0's.

The signal systems shown in FIGS. 4 and 5 are not interchangeable with each other. A UWB signal represented by one signal system cannot be decoded by another signal system.

FIG. 6 is a schematic diagram showing an example of the construction of the transmission frame period used in the radio communication system pertaining to the present invention. It is assumed that the first and second UWB wireless networks 10 and 20 employ different signal systems but the transmission frame period is the same.

As shown in this figure, the transmission frame period is determined by the beacon signal which is sent periodically from the control station of the wireless network.

The beacon signal to determine the frame is followed by the "Contention Access Period" (CAP) and the "Contention-free Period" (CFP). In the former period, each communication apparatus performs asynchronous transmission by means of the random access procedure. In the latter period, communication is performed between specific communication apparatuses.

In the contention-free period, a slot called-guaranteed time slot (GTS) is allocated each time to the transmission (for example, in reply to request for frequency band allocation) from an arbitrary communication apparatus. The example shown in FIG. 6 has three GTS's (GTS-1, GTS-2, and GTS-3) set up in the contention-free period.

As shown in FIG. 1, the first and second UWB wireless networks 10 and 20 have the communication areas which overlap with each other. This situation brings about conflicts, and signals from one network interfere with signals from another network. In the UWB radio communication system, which uses signals spread over a broad frequency band, one wireless network tends to cause conflicts with its adjacent ones. Moreover, it is difficult to operate the UWB radio communication system by switching frequencies as in the conventional radio system.

For the adjacent wireless networks to coexist without mutual conflicts, it is necessary that one wireless network perform transmission after it has recognized the time in which another wireless network is not operating. Consequently, the control station in one network is required to obtain the beacon signal and other control signals transmitted from the control station in another network, thereby grasping how the frequency band is being used.

However, this is not practicable in the radio communication environment pertaining to the embodiment of the present invention. As mentioned earlier with reference to FIGS. 4 and 5, the signal representation is not interchangeable between the wireless networks 10 and 20, in which the signal systems are different depending on the signal aspect, impulse period, impulse width, spread ratio, and spreading code. Hence, the radio communication apparatus in one network cannot decode UWB signals from the radio communication apparatus in another network. In other words, incapability of decoding beacon signals prevents one network from grasping how another network is using the frequency band.

This embodiment, therefore, is intended to make one network know that UWB radio communication systems of different type exist in its vicinity and how the network in that system is operating. This object is achieved by adopting the same signal system (impulse period, impulse width, modulation scheme, and spreading code) in the physical layer used in different UWB radio communication systems.

According to this embodiment, communication between the first and second UWB wireless networks 10 and 20 is accomplished in the following manner. They employ their own signal systems for ordinary information transmission in the contention-free access period; however, the control station of each wireless network employs the common signal system (for example, the one which is adopted by either of the networks) for information (such as beacon signal) to be exchanged by using time division of the transmission frame period.

In this way the control station can grasp how the networks are operating and hence can reserve the band in its network after it has confirmed that time in the transmission period which is not being used by another wireless network. In other words, the control stations transmit the beacon signal using the common signal system, thereby making possible time division of the transmission frame period for the competing wireless networks and making possible the coexistence of the competing wireless networks.

In the radio communication environment according to this embodiment, each wireless network has the common signal transmitting unit to transmit signals common to different wireless communication systems. In this way one wireless communication system can let another wireless communication system know its presence.

Likewise, each wireless network has the common signal receiving unit to receive signals common to different wireless communication systems. In this way one wireless communication system can know the presence of a wireless communication system of different type.

FIG. 7 is a diagram showing how time-division multiplexing is accomplished for the first UWB wireless network 10 and the second UWB wireless network 20.

In the example shown in FIG. 7, the first wireless network 10 has the transmission frame period (71), which starts with the beacon signal (701) of the first wireless network. The beacon signal is followed by the period (702) for use by another system. For this time region (702) are allocated the contention-free period (712) and the timing (713) for transmission of the beacon signal by the second wireless network 20. The second wireless network 20 uses this contention-free access period (712) to allocate the frequency band to the radio communication apparatuses 21 to 25 therein.

In the same way as above, the second wireless network 20 has the transmission frame period (72). In the period (715) for use by another system are allocated the contention-free period (704) and the timing (705) for transmission of the beacon signal by the first wireless network 10. The first wireless network 10 uses this contention-free access period (704) to allocate the frequency band to the radio communication apparatuses 11 to 15 therein.

The time (706) for use by another system is repeated in the transmission frame period of the first wireless network 10. In this time region (706) are repeatedly established the contention-free access period (716) and the timing (717) for transmission of the beacon signal by the second wireless network 20.

As mentioned above, the control station of each network transmits the beacon signal by using the common signal system, so that it can grasp how other networks are operating (or it can detect the time in which the frequency band is being used by other networks). Thus it is possible for each network to have the transmission frame periods displaced so that they do not conflict with the contention-free access period, as shown in FIG. 7. In other words, one network confirms the time which is not being used by another network and then establishes the contention-free access period of its own and allocates the frequency band in itself. Alternatively, one network can establish the contention-free access period such that the period being used by another network is allocated to the communication apparatus at a location liable to interference with communication. In other words, the coexistence of competing networks is realized if they are allowed for time-division of the transmission frame.

The wireless networks 10 and 20 have the contention access periods CAP (703) and (714), respectively, and (707) and (718), respectively, which are arranged in the same time period. This construction facilitates asynchronous transmission and hence random access.

The two networks may transmit not only the beacon signal but also other information by using the common signal system in the contention access period. In this way they may exchange, by using this contention access period, control information necessary for time-division of the transmission frame period.

FIG. 8 is a diagram showing an example of the construction of the beacon signal used in the embodiment of the present invention. As mentioned above, the control station of each wireless network 10 and 20 transmits the beacon signal by using the common signal system.

As shown in FIG. 8, the beacon signal consists of the following segments.

Beacon identifier which identifies the received signal as a beacon signal.

Device identifier which indicates which device is the control station.

Network synchronizing parameter which describes a parameter to synchronize the networks.

Slot allocation information which describes how the guaranteed time slot is allocated.

UWB signal information which describes information about the UWB communication signal system used by this system.

Another system detection information which informs that another system has been detected.

Another system use information which indicates the period being used by another system.

The beacon signal contains such information as network synchronizing parameter, slot allocation information, UWB signal information to be used, another system detection information, and another system use information, which are exchanged to use the transmission frame period in time-division mode. Therefore, by transmitting the beacon signal by using the signal system which is common among the networks, one network can recognize the presence and operation of another network, and they can coexist for their own operation.

Incidentally, not all the individual parameters in the beacon signal shown in FIG. 8 are essential in the present invention; some of them may be omitted if necessary or other parameters may be added according to need.

FIG. 9 is a diagram showing an example of the construction of the common control signal. As in the case of the beacon signal, this control signal is transmitted between the wireless networks 10 and 20 by means of the common signal system. The example shown in FIG. 9 is a format of the control signal which would be exchanged between UWB radio communication systems to request the time-division use of the transmission frame period. This control signal is transmitted on the random access basis in the contention access period.

This common control signal consists of the following segments.

Common control signal identifier which identifies the signal as the common control signal.

Sender device information which indicates which device is the sender's device (this information is uniquely allocated to individual devices).

Recipient device information which indicates which device is the recipient's device (this information is uniquely allocated to individual devices).

Control signal information length which denotes the length of information of the control signal.

Command information which indicates what common command information is contained in the signal.

Time-division use request information which requests time division of the transmission frame period according to the format specified by the command. The common control signal contains information which is exchanged for the transmission frame period to be used in time-division mode. Any other radio communication apparatus than the control station may transmit the common control signal according to the common signal system in the contention access period. In this way it can request the frequency band by random access mode regardless of whether it is within one network or not.

Figure 10:
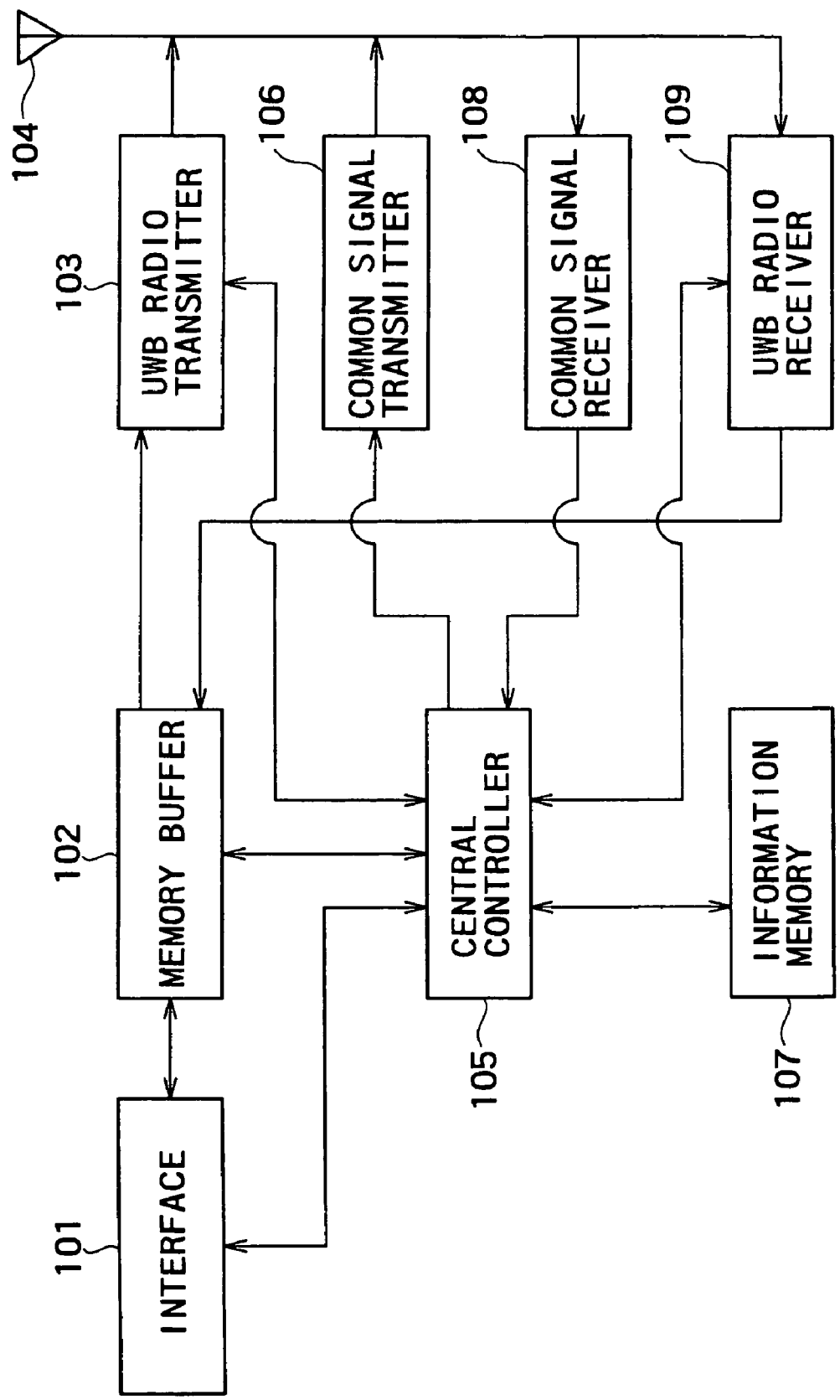
FIG. 10 is a schematic diagram showing the functional construction of the radio communication apparatus 100 that operates in the radio communication environment pertaining to the present invention.

FIG. 10 is a schematic diagram showing the functional construction of the radio communication apparatus 100 that operates in the radio communication environment (See FIG. 1) pertaining to this embodiment. This construction is the same as that of the control station to control the wireless network and that of the radio communication apparatus which is built into a wireless network under control of the control station so that it performs ordinary information exchange. The radio communication apparatus 100 may function differently depending on the program to control its operation.

As shown in FIG. 10, the radio communication apparatus 100 consists of the following components. Interface 101, memory buffer 102, UWB radio transmitter 103, antenna 104, central controller 105, common signal transmitter 106, information memory 107, common signal receiver 108, and UWB radio receiver 109.

The radio communication apparatus 100 can exchange information with another radio communication apparatus under general control by the central controller 105. The central controller 105 consists of a microprocessor, for example. It executes the program codes stored in the information memory 107, thereby controlling the action for asynchronous radio communication.

In the case where the radio communication apparatus 100 functions as the control station in the wireless network pertaining to this embodiment, the central controller 105 generates the beacon signal in a format common with another UWB wireless network and instructs the common signal transmitter 106 to transmit it. The common signal transmitter 106 transmits the beacon signal in prescribed timing through the antenna 104.

When the control station receives through the antenna 104 a beacon signal from another UWB wireless communication network, the received beacon signal is processed by the common signal receiver 108 according to a prescribed procedure and then temporarily stored in the memory buffer 102. The central controller 105 analyzes the content of the received beacon signal, thereby grasping the presence of another network. It also acquires information about how another network is operating (such as transmission frame period and the frequency band in the transmission frame period). This information is stored in the information memory 107. The network changes its network setting information (such as transmission frame period) according to thus stored information and then generates a beacon signal according to the change thus made.

The radio communication apparatus 100 (other than the control station), which works as an ordinary communication terminal, receives through the antenna 104 the beacon signal in the common signal format transmitted from the control station. The received beacon signal is supplied to the common signal receiver 108 for reception processing. The information of the received beacon signal is supplied to the central controller 105 for analysis. In other words, when a beacon signal is received from the control station within one's own network, it acquires the transmission frame period and the band allocation to one's own network within the frame period according to the information contained in the signal. In the case of a beacon signal transmitted from another UWB wireless communication network, it can grasp the presence of another wireless network according to the result of analysis.

Moreover, in addition to transmitting and receiving the beacon signal, the radio communication apparatus 100 also transmits and receives common control information (request for setting up a period to be used by another system, see FIG. 9) if there exists a different UWB wireless communication system. And such information is processed in the same way as mentioned above.

The common signal transmitter 106 transmits data in a signal format common with another wireless communication network. The common signal receiver 108 receives data in a signal format common with another wireless communication network. The UWB radio transmitter 103 transmits data in a signal format which is used within its own network. The UWB radio receiver 109 receives data in a signal format which is used within its own network.

Of course, if the signal format adopted in one network agrees with the signal format common with another network, the common signal transmitter 106 and the common signal receiver 108 are not necessary. Instead, all that is necessary is a pair of the UWB radio transmitter 103 and the UWB radio receiver 109. In the case where the radio communication apparatus 100 (other than the control station) works as an ordinary communication terminal, the common signal transmitter 106 is necessary to receive the beacon signal (in the common signal format) transmitted from the control station. However, it is not always necessary unless transmission is performed in the common signal format.

If there is information supplied from a connected apparatus (not shown), the interface 101 stores this information in the memory buffer 102 and informs the central controller 105 of the address to which the information is sent wirelessly. In response to this action, the central controller 105 supplies the transmission information to the UWB radio transmitter 103 according to the access control method inherent in the UWB radio communication system, and it transmits the information signal through the antenna 104. The transmission of information may be accomplished such that the guaranteed time slot (GTS) is set up in the contention-free period in the transmission frame period.

In the case where the radio communication apparatus 100 receives an ordinary information signal, it activates the common signal receiver 108 in the previously exchanged timing, thereby causing it to receive the signal through the antenna 104. The thus obtained information is stored in the memory buffer 102. The received information is reconstructed in the memory buffer 102, and the reconstructed information is supplied to the connected apparatus (not shown) through the interface 101.

The apparatus connected through the interface 101 may be an information processing apparatus such as personal computer and PDA. Although the information processing apparatuses of this kind have no radio communication function, they can transmit wirelessly the data processed therein or receive information transmitted from other apparatuses, if they are connected to the communication apparatus as shown in FIG. 10.

Figure 11:
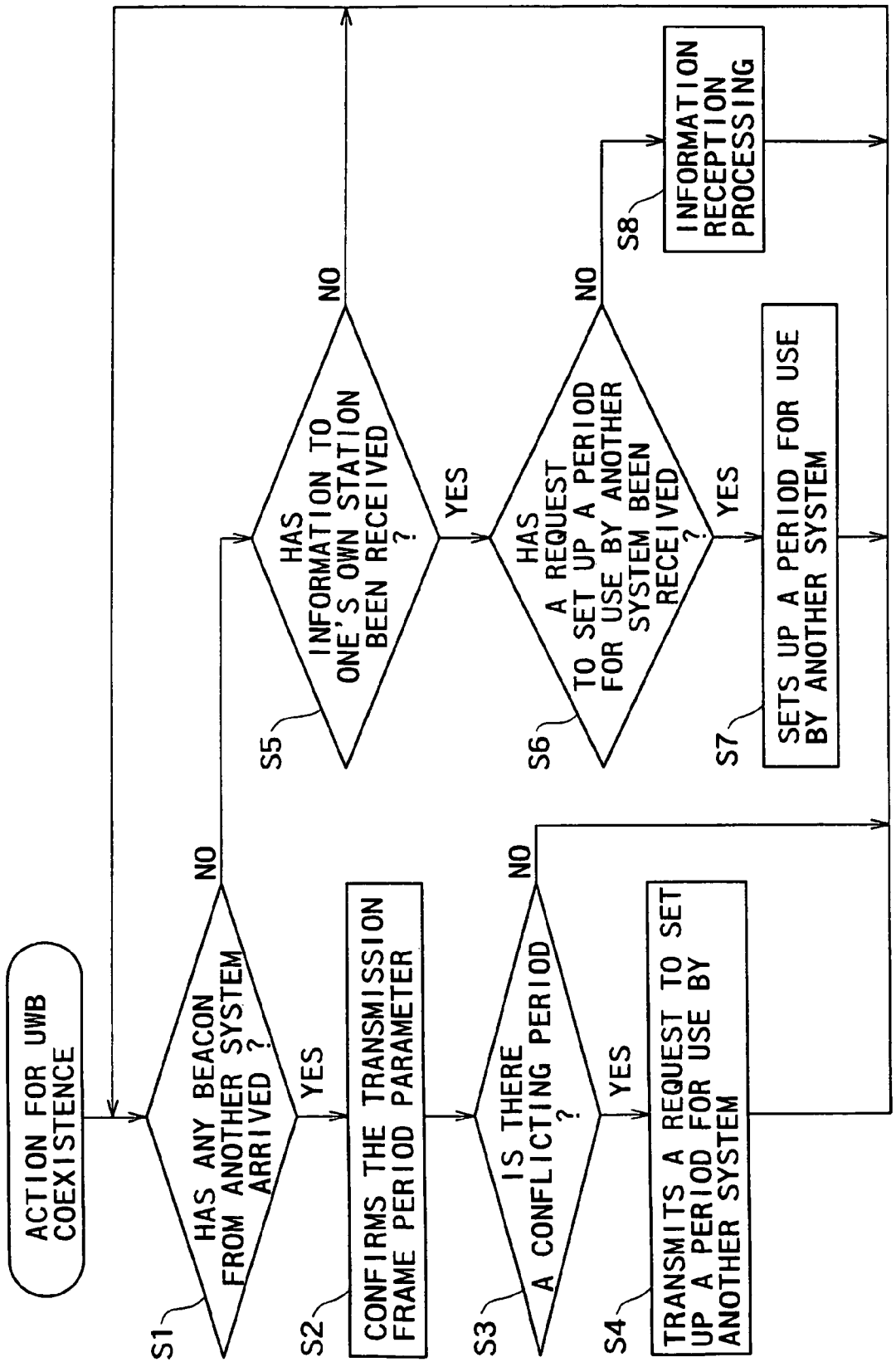
FIG. 11 is a flow chart showing the procedure for communication processing by which the radio communication apparatus 100 pertaining to the embodiment works as the control station.

FIG. 11 is a flow chart showing the procedure for communication processing by which the radio communication apparatus 100 pertaining to the embodiment works as the control station. In actual, this processing is realized as the central controller 105 executes the program codes stored in the information memory 107. The radio communication apparatus 100 performs such processing, thereby realizing the coexistence of different UWB radio communication networks.

First, the common signal receiver 108 confirms whether or not a beacon signal transmitted from another system has been received. (Step S1)

If there is a beacon signal transmitted from another system, the process moves to Step S2 to grasp the transmission frame period and band allocation of the system.

Then, it compares the band allocation of another network with that of its own network and detects the presence or absence of the time of mutual confliction. (Step S3)

In the case where there is a conflict in the band allocation, the flow moves to Step S4 to supply to the common signal transmitter 106 a request for setting up the period for use by another system. The common signal transmitter 106 sends this request to another radio communication system as the common control signal. This process may be modified such that time-division multiplexing for another system is performed on one's own transmission frame period.

The flow returns to Step S1, and the common signal receiver 108 continues the process for reception.

In the case where the common signal receiver 108 judges in Step S1 that no beacon signal has been received, it subsequently judges whether or not it has received any other information addressed to its station. (Step S5)

If it has received the common control signal addressed to its station, then it judges whether or not it has received the request for setting up the period for use by another system. (Step S6)

At this time, if it has received the request for setting up the period for use by another system, then it sets up the period for use by another system. (Step S7) It writes to that effect in the beacon signal and performs time-division multiplexing for the transmission frame period. After that, the flow returns to Step S1, and the common signal receiver 108 continues the process for reception.

In the case where the common signal receiver 108 judges in Step S4 that it has received signals addressed to its station (other than the signal requesting for setting up the period for use by another system), then the flow moves to Step S8, and it performs the process of receiving the information. Then, the flow returns to Step S1, and the common signal receiver 108 continues the process for reception.

FIG. 12 is a modified flow chart showing the procedure for communication processing by which the radio communication apparatus 100 pertaining to the embodiment works as the control station. In actual, this processing is realized as the central controller 105 executes the program codes stored in the information memory 107. The radio communication apparatus 100 performs such processing, thereby realizing the coexistence of different UWB radio communication networks having a different physical layer.

First, the UWB radio receiver 109 or the common signal receiver 108 confirms whether or not a beacon signal transmitted from another system has been received. (Step S1) The term "beacon" as used herein denotes not only the beacon information transmitted by using the period indicated by "B" in the transmission frame period shown in FIG. 7 but also the common control signal in the contention access period shown in FIG. 9. This common control signal is transmitted periodically (or continuously or randomly).

If the presence of another system is detected by the beacon signal transmitted from another system, the flow moves to the next step S12 so as to grasp the transmission frame period and band allocation of another system.

Then, it compares the band allocation of another network with that of its own network and detects the presence or absence of the time of mutual confliction. (Step S13)

In the case where there is a conflict in the band allocation, the flow moves to Step S14 to supply to the common signal transmitter 106 a request for setting up the period for use by another system. The common signal transmitter 106 sends this request to another radio communication system as the common control signal. This process may be modified such that time-division multiplexing for another system is performed on one's own transmission frame period. In this case, it writes to this effect in the beacon signal of one's own system, and this beacon signal is transmitted from the UWB radio transmitter 103 to one's own radio system (Step S15).

The flow returns to Step S11, and the common signal receiver 108 continues the process for reception.

In the case where the UWB radio receiver 109 or the common signal receiver 108 judges in Step S11 that no beacon signal has been received from another system, it subsequently judges in Step S16 whether or not it has received any other information addressed to its station.

If it has received the common control signal addressed to its station, then it judges whether or not it has received the request for setting up the period for use by another system. (Step S17)

At this time, if it has received the request for setting up the period for use by another system, then it sets up the period for use by another system. (Step S18) It writes to that effect in the beacon signal of one's own system and performs time-division multiplexing for the transmission frame period. It transmits the beacon signal from the UWB radio transmitter 103 to other radio communication apparatuses in its own wireless network.

After that, the flow returns to Step S11, and the UWB radio receiver 109 or the common signal receiver 108 continues the process for reception.

In the case where the common signal receiver 108 judges in Step S17 that it has received signals addressed to its station (other than the signal requesting for setting up the period for use by another system), then the flow moves to Step S20, and it performs the process of receiving the information. Then, the flow returns to Step S11, and the UWB radio receiver 109 or the common signal receiver 108 continues the process for reception.

Although the invention has been described in its preferred form with a certain degree of particularity, it is to be understood by those skilled in the art that various changes and modifications may be made in the invention without departing from the spirit and scope thereof. The scope of the invention is therefore to be determined solely by the appended claims.

As mentioned above in detail, the present invention provides an improved radio communication system which permits a plurality of wireless networks to coexist even though they compete with others by using the same frequency band. The present invention also provides an apparatus, method, and computer program for the radio communication system.

The present invention provides an improved radio communication system which permits a plurality of wireless networks using different signal systems to coexist without conflicts. The present invention also provides an apparatus, method, and computer program for said radio communication system.

According to the present invention, one UWB radio communication system is made to know the presence of a nearby different UWB radio communication system because they use the same signal system (pulse period, pulse width, modulation scheme, and spreading code) in the physical layer.

According to the present invention, one UWB radio communication system is made to know the presence of a nearby different UWB radio communication system and how the network is being operated because they use the same beacon signal system (pulse period, pulse width, modulation scheme, and spreading code).

According to the present invention, two different UWB radio communication systems present close to each other can operate their networks without conflicts because they use the common signal system for information to be exchanged for time-division of the transmission frame period.

According to the present invention, one radio communication system is made to know the presence of another different radio communication system because they have the common signal transmitter to transmit signals common between them.

According to the present invention, one radio communication system is made to know the presence of another different radio communication system because have the common signal receiver to receive signals common between them.

The foregoing invention has been described in terms of preferred embodiments. However, those skilled, in the art will recognize that many variations of such embodiments exist. Such variations are intended to be within the scope of the present invention and the appended claims.

What is claimed is:

1. A radio communication system comprising a plurality of wireless networks that use different signal systems, wherein
control information is exchanged between a control station in one wireless network of said plurality of wireless networks and a control station of another wireless network of said plurality of wireless networks by using a beacon signal system common to said one wireless network and to said another wireless network, wherein the control information is used by a competition solving means to solve competition between said one wireless network and said another wireless network, and subsequently transmission of information is accomplished in said one wireless network without interference with said another wireless network.

2. A method for radio communication that works in a wireless network environment in which there coexist a plurality of wireless networks that use different signal systems, said method for radio communication comprising a common signal reception step to receive control information transmitted from one wireless network of said plurality of wireless networks by using a beacon signal system common with a beacon signal system of another wireless network of said plurality of wireless networks, and using the received control information to solve a competition between said one wireless network and said another wireless network;

a radio transmission/reception step to execute an information transmission action within its own network based on the control information from said another wireless network that has been received by said common signal reception step.

3. A computer program written in a computer-readable format to be executed on a computer system that does processing for operation in a wireless network environment in which there coexist a plurality of wireless networks that use different signal systems, said computer program comprising a common signal reception step to receive control information transmitted from one wireless network of said plurality of wireless networks by using a beacon signal system common with a beacon signal system of another wireless network of said plurality of wireless networks, and using the received control information to solve a competition between said one wireless network and said another wireless network;

a radio transmission/reception step to execute the an information transmission action within said one wireless network based on the control information from said another wireless network that has been received in said common signal reception step.

* * * * *

UNITED STATES PATENT AND TRADEMARK OFFICE
CERTIFICATE OF CORRECTION

| | | |
|---|---|---|
| PATENT NO. | : 6,980,819 B2 | Page 1 of 1 |
| APPLICATION NO. | : 11/185562 | |
| DATED | : December 27, 2005 | |
| INVENTOR(S) | : Sugaya et al. | |

It is certified that error appears in the above-identified patent and that said Letters Patent is hereby corrected as shown below:

On the face of the patent, Field (30) please insert Foreign Application Priority Data:

--Japan 2002-059430 filed March 5, 2002--

Signed and Sealed this

Twenty-fifth Day of July, 2006

JON W. DUDAS
*Director of the United States Patent and Trademark Office*